F. R. SUTER.
VARNISH AND MANUFACTURE THEREOF.
APPLICATION FILED FEB. 24, 1908.
905,384.
Patented Dec. 1, 1908.
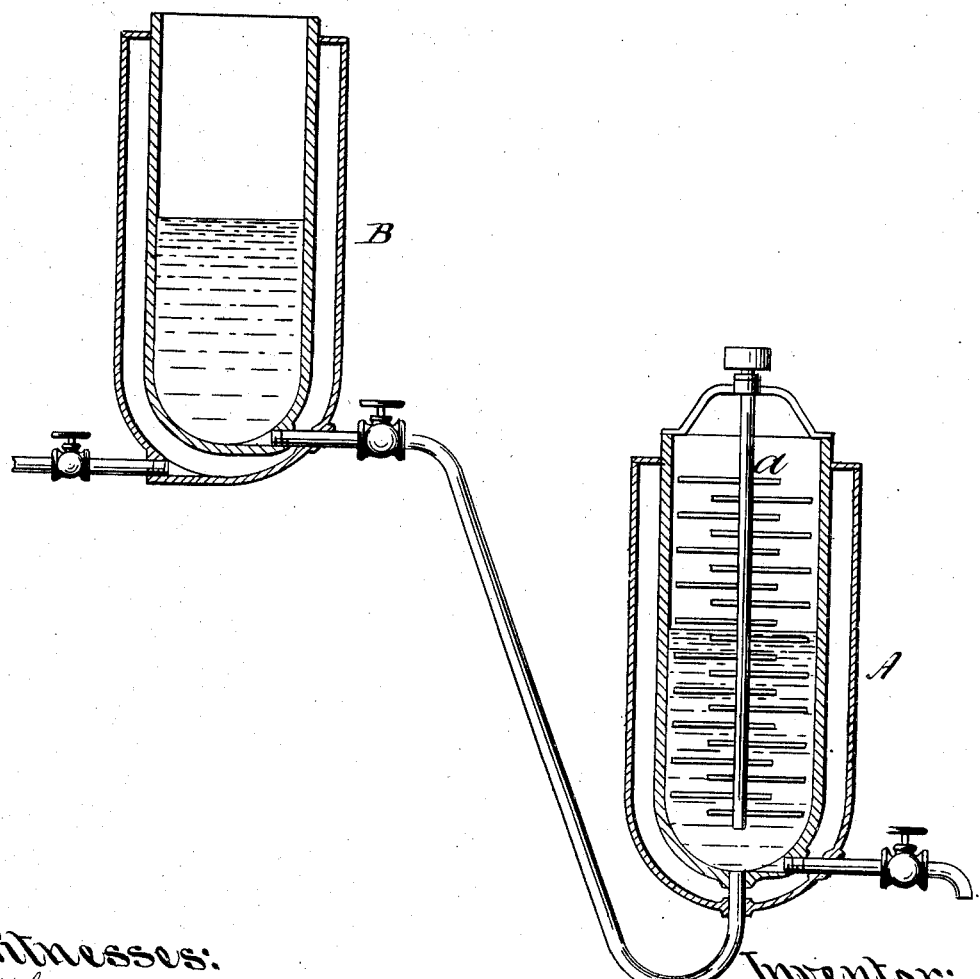

UNITED STATES PATENT OFFICE.

FRANK R. SUTER, OF NEW YORK, N. Y., ASSIGNOR TO NEW PROCESS VARNISH COMPANY, A CORPORATION OF NEW YORK.

VARNISH AND MANUFACTURE THEREOF.

No. 905,384.     Specification of Letters Patent.     Patented Dec. 1, 1908.

Application filed February 24, 1908. Serial No. 417,251.

*To all whom it may concern:*

Be it known that I, FRANK R. SUTER, formerly a subject of the Emperor of Germany, but having declared my intention of becoming a citizen of the United States, and residing in the borough of the Bronx, city, county, and State of New York, have invented certain new and useful Improvements in Varnishes and the Manufacture Thereof, of which the following is a specification.

My invention relates to the production of varnishes the bases of which are various gums, resins and so-called colophonic substances which are diluted with a suitable vehicle such as turpentine, oils or alcohol in the manner well known and practiced.

In the past various attempts have been made in the art to use molasses as a substitute in part for gums or colophony, but owing to the presence in the molasses of certain salts, these attempts have heretofore been unsuccessful in a practical or commercial sense, in so far as I am aware.

By my method of producing a compound of molasses and colophony in the manufacture of varnishes, I not only produce a cheaper but also a superior product, as hereinafter set forth.

The accompanying drawing represents diagrammatically means for carrying out my improved process of manufacturing varnish.

The gums, resins or colophony are melted in a boiler A, which is steam-jacketed or otherwise provided with means for suitably heating the contents thereof in the usual manner, said boiler A being also provided with means $a$, for agitating its contents. The molasses is heated in a separate boiler B, also steam-jacketed or otherwise provided with means for heating the molasses contained therein, the boiling process being continued until the water originally contained in the molasses has been evaporated as far as possible by this method, say down to a minimum of five or three per cent. The gums, resins or colophony in the boiler A, having been melted and reduced to a proper degree of fluidity, the molasses is introduced into said kettle A, and thoroughly mixed with the contents thereof. This may obviously be accomplished in various ways and I do not limit myself in this respect strictly to the exact means herein disclosed. The preferred method however is to introduce the reduced molasses from the boiler B into the bottom of the boiler A, and below the contents thereof, by means of gravity, as illustrated in the drawings, or, if found more expedient, it may be pumped or otherwise forcibly injected into the boiler A, below the contents thereof.

The molasses being of less specific gravity and having a lower boiling point than the reduced gums &c., in the boiler A, the natural result is that the molasses rises and permeates through the contents of said boiler A, and the admixture is rendered more thorough and complete by the use of the agitator $a$. The excess of heat in the boiler A, owing to the higher boiling point of the gums &c., contained therein, evaporates and eliminates the small residue of moisture carried over by the molasses from its boiler B, and this result is contributed to and insured by the introduction of the reduced molasses into the boiler A, below the contents thereof. The elimination of all free water from the admixture is an important consideration because its presence even in an infinitesimal quantity is detrimental to the product in that it prevents the perfect blending and union of the ingredients.

After the molasses, gums, &c., have been thoroughly mixed in the boiler A, the contents thereof is allowed to cool off somewhat before the introduction of the asphalt distillate and the vehicle with which it is diluted so as to prevent loss therefrom by evaporation. The distillate of asphalt preferably employed is that known commercially as primol, diluted in a suitable vehicle such as turpentine or alcohol, which compound is added to and mixed with the contents of the boiler A, in sufficient quantity to cause the salts present to form a stable, insoluble compound with the colophony owing to the catalytic influence of the asphalt distillate.

While I do not confine myself to relative proportions of constituent parts of the composition, the following may be cited by way of example, namely for one hundred pounds; thirty pounds of either copal or dammer gum, twenty pounds of resin or colophony, twenty pounds of molasses (beet or cane), twenty-five pounds of alcohol, and five pounds of asphalt distillate.

What I have successfully accomplished is the quick and economical production of a varnish which not only possesses the good qualities of the best natural gum varnish known, but which also has nearly if not quite the same chemical composition and peculiar molecular structure as a natural gum varnish. In the combination of the colophony and the molasses as produced by my process, the solubility in water and the attraction for moisture of the molasses is absolutely extirpated as much as it is in the best natural copal or kauri gums. This is due to the fact that both the colophony and the molasses lose their natural characteristics in chemically combining to produce a distinct compound by reason of the presence of the asphalt distillate.

By my improved process I positively eliminate all moisture from the composition, and also render innocuous the salts in the molasses. As a result I am enabled to produce a product which is not only from twenty-five to fifty per cent. cheaper than any heretofore produced commercially, but which also possesses many other advantages that render it valuable in a practical sense. The addition of the molasses and distillate of asphalt to the melted gums, resins or colophony does not in the least interfere with or impair the hardening of the product whether the same be a varnish, shellac or lacquer, but on the contrary insures a finer and more durable polish or surface than heretofore. The molasses imparts a certain degree of elasticity to the varnish which not only renders it easier to spread and manipulate evenly, but also renders the varnish when dry less brittle and less liable to crack or "craze", at the same time affording a superior glaze; while the incorporation of the primol into the composition increases the endurance and resistance of the latter to wear, so that the product becomes an ideal surface protector superior even to the more expensive varnishes containing a relatively large percentage of gum.

What I claim as my invention and desire to secure by Letters Patent is,

1. The process of manufacturing varnish herein set forth, consisting in introducing molasses, from which most of the water has been eliminated by boiling, into melted resin, and then adding to the mixture a distillate of asphalt diluted with a suitable vehicle, for the purpose described.

2. The process of manufacturing varnish herein set forth, consisting in introducing molasses, from which most of the water has been eliminated by boiling, into melted resin, agitating the admixture, and then adding thereto a distillate of asphalt diluted with a suitable vehicle, for the purpose described.

3. The process of manufacturing varnish herein set forth, consisting in introducing under pressure molasses, from which most of the water has been eliminated by boiling, into melted resin, and then adding to the mixture a distillate of asphalt diluted with a suitable vehicle, for the purpose described.

4. The process of manufacturing varnish herein set forth, consisting in introducing under pressure molasses, from which most of the moisture has been eliminated by boiling, into melted resin below the surface thereof, and then adding thereto a distillate of asphalt diluted with a suitable vehicle, for the purpose described.

5. The process of manufacturing varnish herein set forth, consisting in introducing under pressure molasses, from which most of the moisture has been eliminated by boiling, into melted resin below the surface thereof, agitating the mixture, and then adding thereto a distillate of asphalt diluted with a suitable vehicle, for the purpose described.

6. A varnish consisting of resin, molasses from which the moisture has been eliminated, and a distillate of asphalt diluted with a suitable vehicle.

FRANK R. SUTER.

Witnesses:
CHAS. ZIMMERMAN, Jr.,
GEO. WM. MIATT.